RECORD CHANGER SPINDLE

Filed Oct. 20, 1965 5 Sheets-Sheet 1

Inventor
James L. D. Morrison
By Brown, Jackson,
Boettcher & Dienner Att'ys.

Dec. 17, 1968 J. L. D. MORRISON 3,416,805

RECORD CHANGER SPINDLE

Filed Oct. 20, 1965 5 Sheets-Sheet 2

Inventor
James L. D. Morrison
By Brown, Jackson,
Boettcher & Dienner Attys.

Inventor
James L. D. Morrison
By Brown, Jackson, Boettcher & Dienner Att'ys

Dec. 17, 1968 J. L. D. MORRISON 3,416,805

RECORD CHANGER SPINDLE

Filed Oct. 20, 1965 5 Sheets-Sheet 4

Inventor
James L. D. Morrison
By Brown, Jackson,
Boettcher & Dienner Att'ys

Dec. 17, 1968 J. L. D. MORRISON 3,416,805

RECORD CHANGER SPINDLE

Filed Oct. 20, 1965 5 Sheets-Sheet 5

Inventor
James L. D. Morrison
By Brown, Jackson, Boettcher & Dienner Att'ys

United States Patent Office 3,416,805

Patented Dec. 17, 1968

3,416,805

RECORD CHANGER SPINDLE

James L. D. Morrison, 2045 Mandeville Canyon Road, Los Angeles, Calif. 90049

Filed Oct. 20, 1965, Ser. No. 498,938
12 Claims. (Cl. 274—10)

ABSTRACT OF THE DISCLOSURE

A record changer spindle of the self-supporting type having a pair of rotary cams about the lower end of the spindle beneath the turntable surface, the turntable being rotatably supported about the spindle by means of a bearing which encircles the upper one of the cams, the upper cam operating the record lowering means and having its upper edge adjacent the turntable surface, the second rotary cam which operates the record stack supporting means during the record change cycle being located immediately below the first rotary cam.

The present invention relates to a record changer spindle of the self-supporting type having a plurality of record supporting fingers which project radially outwardly of a spindle body to support a stack of records on an upper storage portion of the spindle without need for additional stabilizing means such as the usual record support arm which rests on top of the record stack to prevent tilting thereof. The spindle mechanism of the present invention is particularly suited for use in a self-supporting record changer spindle of the type which supports a stack of records to be played on an upper storage portion of the spindle and during a record change cycle lowers the bottom record of the stack in a controlled manner substantially the entire distance to the truntable so as to avoid the damage ordinarily caused by dropping of the records.

In my copending application, Ser. No. 268,042, filed Mar. 26, 1963, now U.S. Letters Patent 3,241,838, issued Mar. 22, 1966, I have described and claimed actuating mechanism including a pair of rotary cam members which are disposed at the lower end of a record changer spindle and are rotatable about the vertical axis thereof for imparting movement to longitudinal rod or tube means or the like which move vertically inside of the spindle body to actuate record feeding mechanism for supporting a stack of records and releasing one at a time to a turntable for playing. In another of my copending applications, Ser. No. 299,336, filed Aug. 1, 1963, now U.S. Letters Patent 3,241,839 issued Mar. 22, 1966, I have shown such rotary cam actuating mechanism embodied in a self-supporting spindle of the type which lowers a record from an upper storage position down substantially the entire distance to the turntable.

It will be understood that where the record supporting fingers of a self-supporting type spindle are designed to lower a record under control from an upper storage position down substantially the entire distance to the turntable, the vertical stroke of such fingers must be much greater than if the fingers were simply lowered a short distance and then retracted into the spindle body to drop the record the remaining distance to the turntable. Accordingly, the actuating mechanism which controls the vertical movement of the record supporting fingers must provide for the increased vertical stroke thereof. While it has been found to constitute an important advantage to be able to lower a record to the turntable rather than drop the record, yet a problem has been created due to the resultant size of the overall spindle mechanism. That is, the increased vertical stroke which the actuating mechanism must provide has resulted in spindle assemblies which are duly long in their overall vertical dimensions.

The present invention relates in part to an improvement in my earlier spindle actuating mechanism in order to provide for the increased vertical stroke of the record supporting fingers without the necessity of a corresponding increase in the overall axial length of the spindle assembly.

It is thus an object of the present invention to provide a self-supporting record lowering spindle having improved rotary cam type actuating mechanism which provides for a substantial vertical stroke of the record supporting fingers while minimizing the overall vertical length of the spindle mechanism.

A further object of the invention is to provide a self-supporting record changer spindle having improved record supporting finger mechanism for supporting a stack of records in an upper storage position on the spindle and releasing one record at a time to the turntable for playing.

The foregoing and other objects and advantages of the invention will be apparent from the following description thereof.

Now in order to acquaint those skilled in the art with the manner of practicing and utilizing my invention, I shall describe in conjunction with the accompanying drawings a preferred embodiment of the invention.

Figure 1:
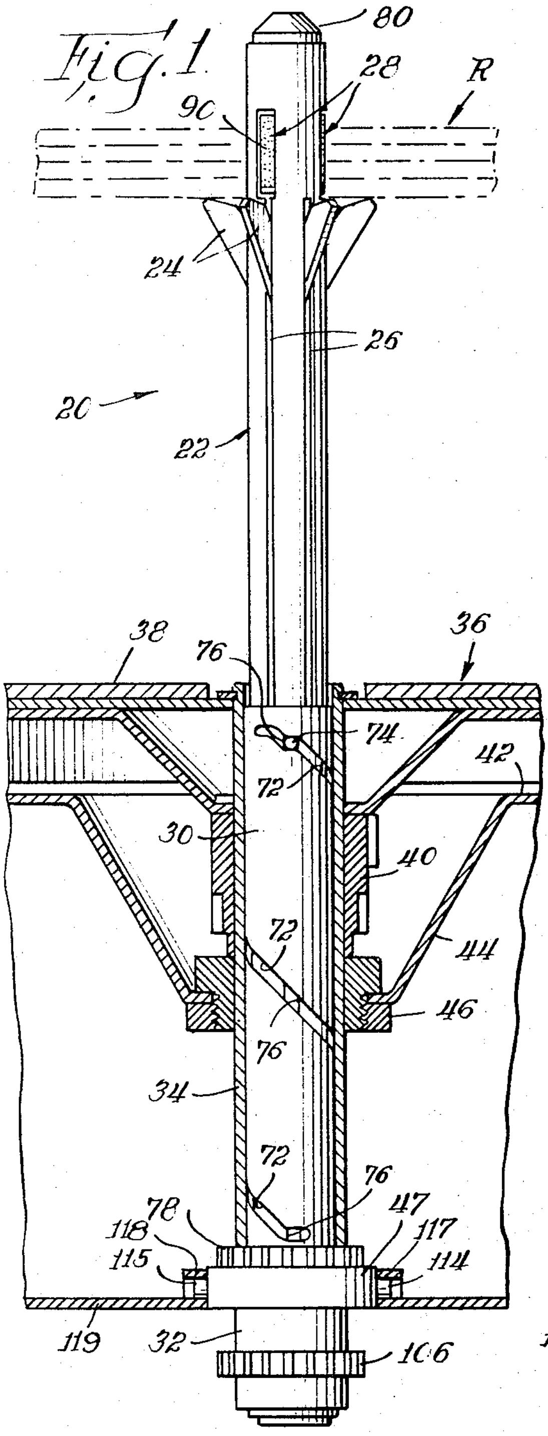
FIGURE 1 is an elevational view, parlty in section and partly broken away, showing a record changer spindle constructed in accordance with the present invention, there being shown a plurality of record supporting fingers disposed in their normal upper positions for supporting a stack of records on an upper storage portion of the spindle.
Figure 3:
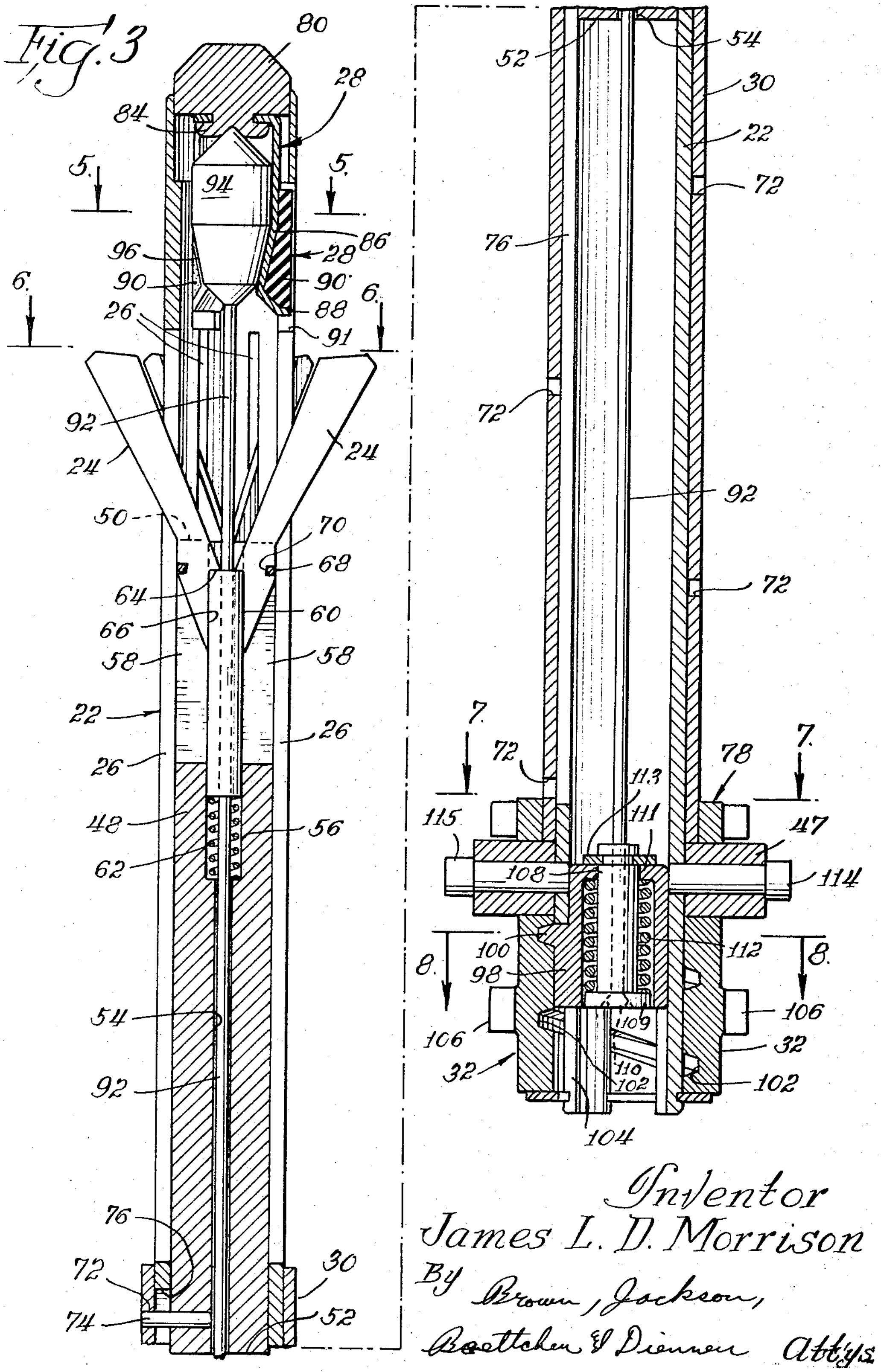
Figure 4:
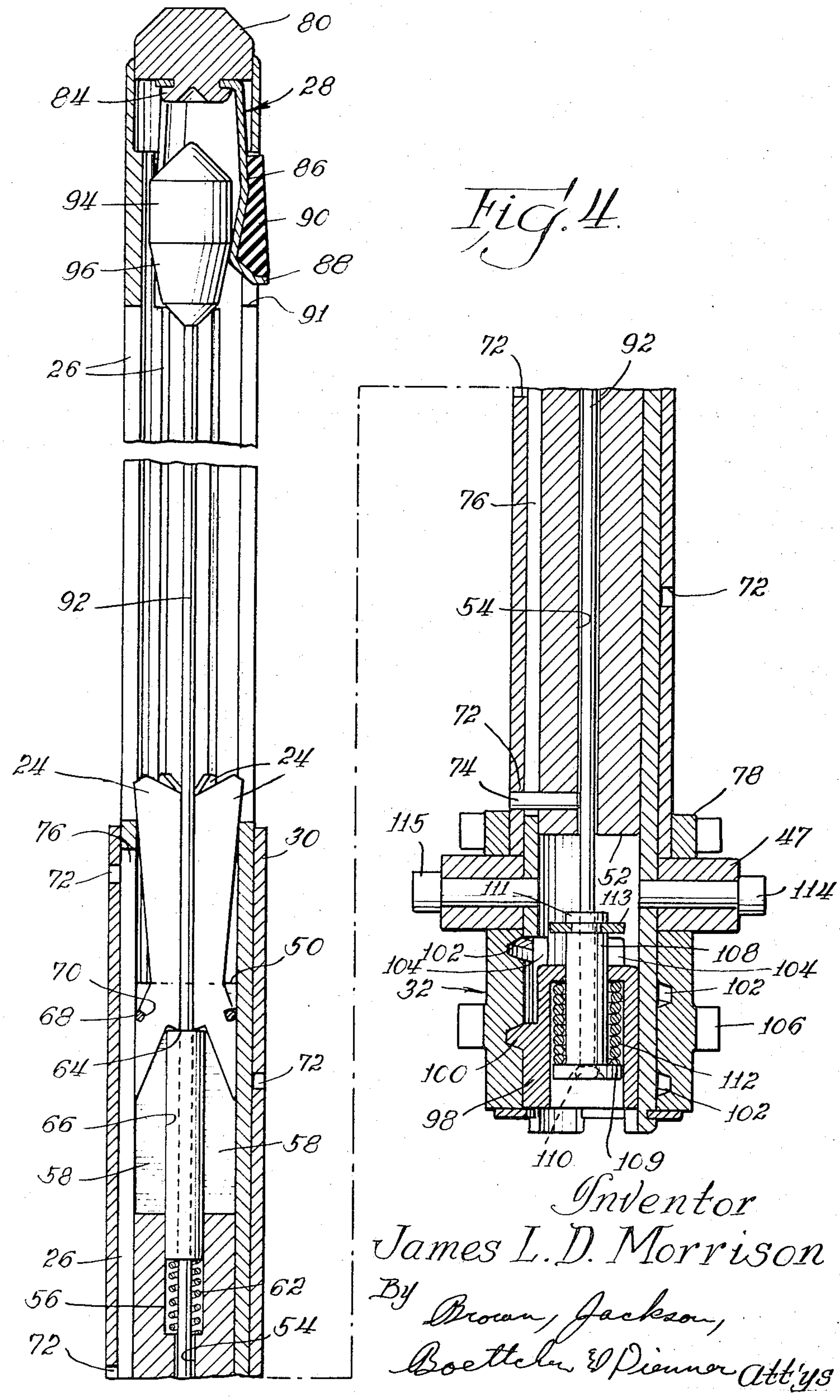
Figures 5, 6, 7:
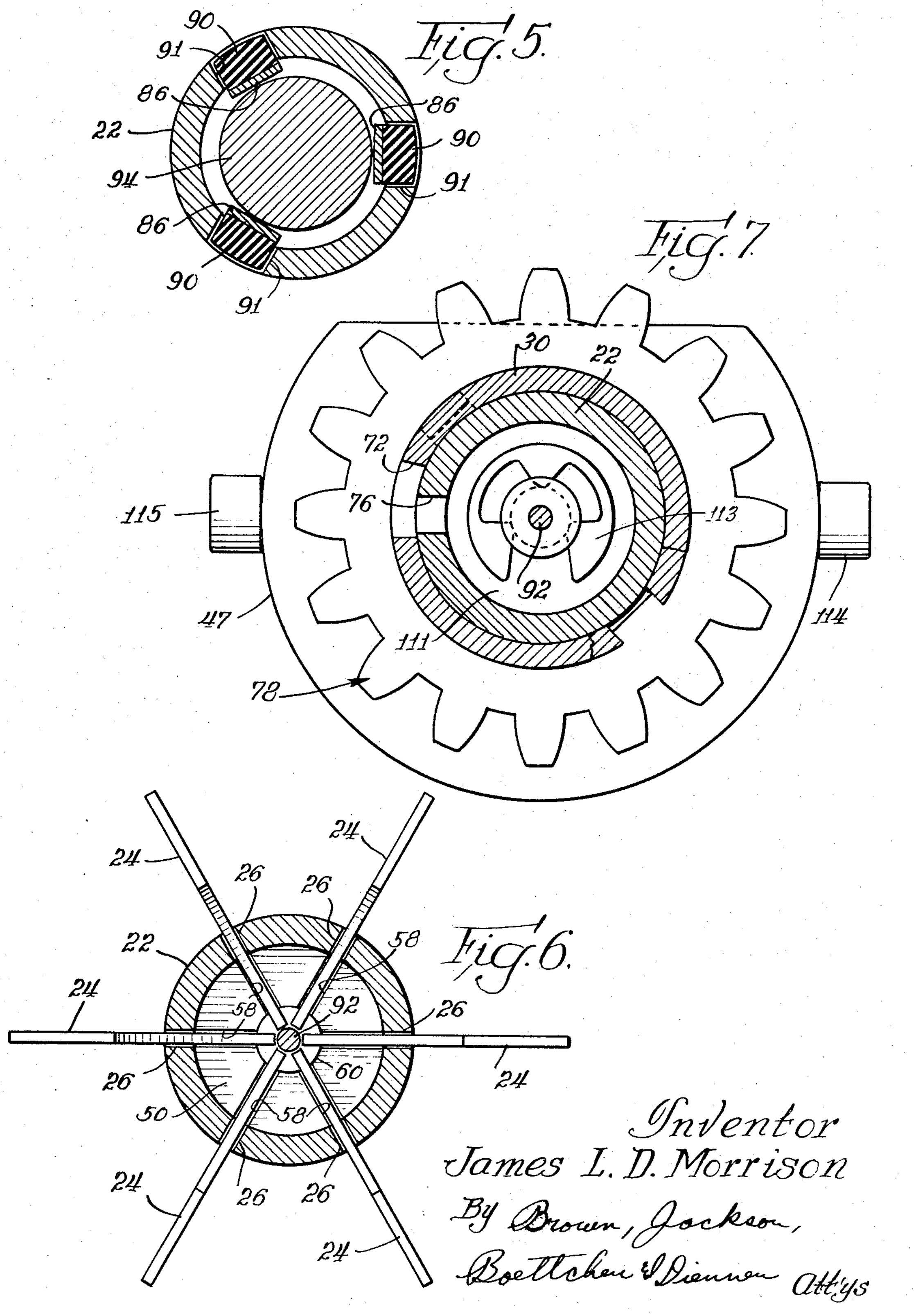
Figures 8, 9, 10, 11:
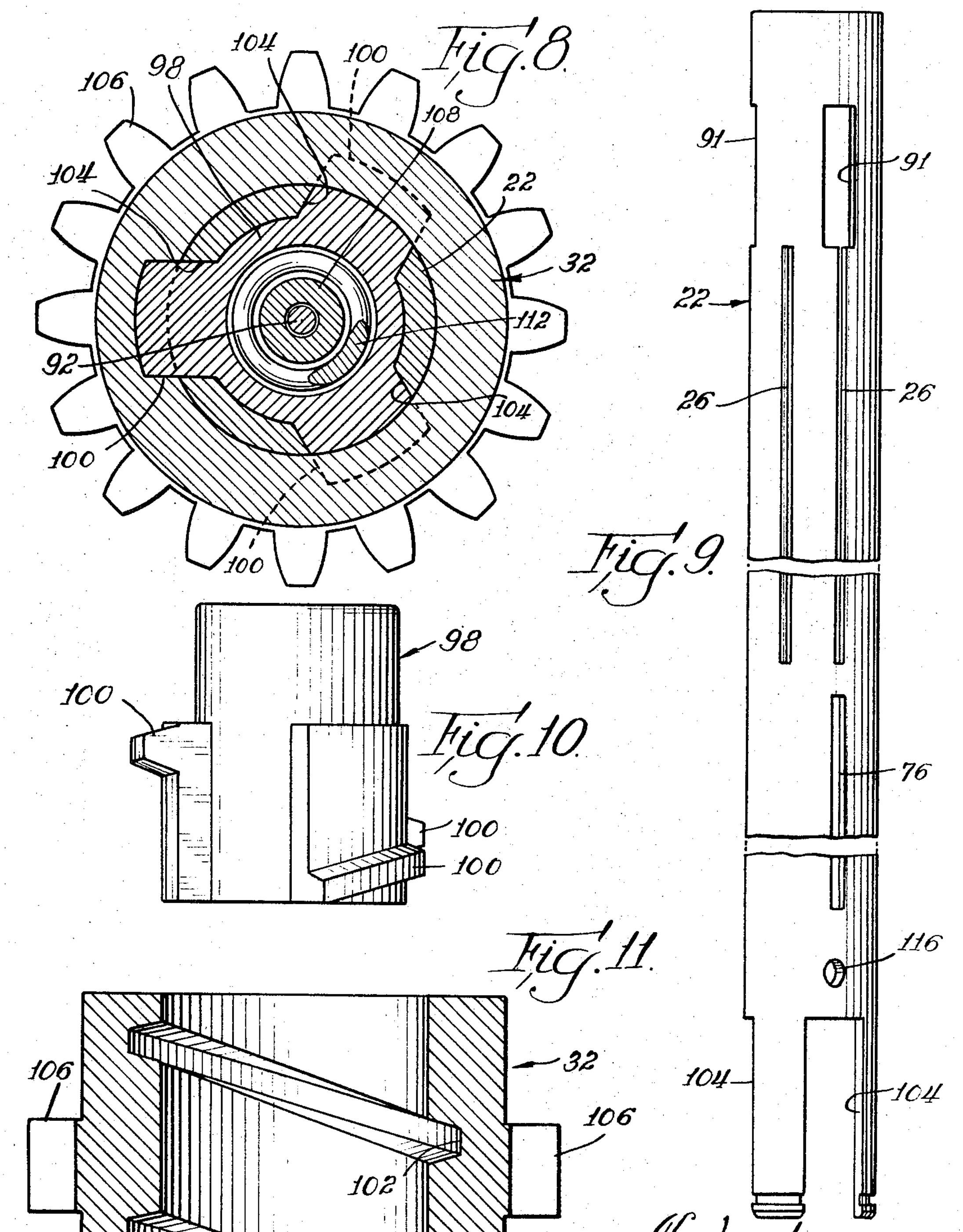

FIGURE 3 is an enlarged vertical sectional view of the record changer spindle of FIGURE 1, with the turntable and baseplate structure and related parts removed, showing the record supporting fingers in their normal upper extended positions wherein they will support a stack of records on an upper storage portion of the spindle, and showing thereabove at the upper end of the spindle a plurality of record gripping fingers in their normal radially retracted inoperative positions;

FIGURE 4 is a vertical sectional view, partly broken away, which is similar to FIGURE 3 and shows the record supporting fingers in their lowered radially retracted positions, the record gripping fingers being shown in their operative radially extended positions wherein they are adapted to support all but the lowermost one of a stack of records on the upper storage portion of the spindle;

FIGURE 5 is an enlarged transverse sectional view taken substantially along the line 5—5 of FIGURE 3;

FIGURE 6 is an enlarged transverse sectional view taken substantially along the line 6—6 of FIGURE 3;

FIGURE 7 is an enlarged transverse sectional view taken substantially along the line 7—7 of FIGURE 3;

FIGURE 8 is an enlarged transverse sectional view taken substantially along the line 8—8 of FIGURE 3;

FIGURE 9 is a detail elevational view, partly broken away, showing a spindle body member which comprises one component of the record changer spindle of FIGURE 3;

FIGURE 10 is an enlarged detail elevational view of a threaded follower member which is yieldingly connected with a center rod member for actuating the record gripping fingers at the upper end of the sprindle; and FIGURE 11 is an enlarged detail vertical sectional view of a rotary cam member having an internal helical thread or cam track, the cam member being assembled over the follower member of FIGURE 10 to control axial movement of the latter.

Referring now to the drawings, FIGURE 1 shows a record changer spindle 20 comprising a spindle body 22, six equally spaced primary record supporting fingers 24 which project outwardly through corresponding vertical slots 26 in the spindle body, and three equally spaced secondary record gripping fingers 28 which are disposed above the supporting fingers 24. The record supporting fingers 24 are shown in their normal upper radially extended positions wherein they support a stack of records R on an upper storage portion of the spindle 20, while the gripping fingers 28 are shown in their normal radially retracted non-gripping positions wherein they permit the records R to be freely passed downwardly over the upper end of the spindle body 22. It will be understood that during a record change cycle when it is desired to release one of the records R to a turntable for playing, the gripping fingers 28 are radially extended to support all but the lowermost record in the stack, and then the supporting fingers 24 are lowered in order to lower the bottom record in the stack to the turntable for playing.

FIGURE 1 further shows a first relatively long rotary cam member 30 which controls the movement of the record supporting fingers 24, a second rotary cam member 32 which controls the movement of the record gripping fingers 28, a thin-walled tubular cover 34 which surrounds the first rotary cam 30, and a turntable 36 having a record supporting surface 38. A bearing sleeve 40 is mounted over the stationary tubular cover 34 is fixedly secured to the turntable 36 for conjoint rotation therewith. A baseplate 42 includes depending framework 44 which is anchored to a spindle supporting member 46 which is annular in shape and encircles the tubular cover member 34. A further spindle supporting member 47 is mounted over the lower end of the tubular cover 34 and is anchored to the adjacent framework in any suitable manner.

Referring now to FIGURES 3 and 4, there is shown a cylindrical finger carrier member 48 which is vertically slidable within the spindle body 22. The upper end of the finger carrier is shown at 50 and the lower end thereof at 52, and it will be seen that there is a small diameter central bore 54 which extends throughout the length of the finger carrier 48 and communicates with an enlarged diameter counterbore 56 at the upper end of the carrier. Also at the upper end of the finger carrier 48 there are provided six equally spaced vertical slots 58 which receive the six record supporting fingers 24. A tubular plunger 60 is disposed within the enlarged bore 56 of the finger carrier 48, and a compression spring 62 is positioned in the lower end of the bore 56 beneath the plunger 60 to bias the latter upwardly.

Each of the record supporting fingers 24 has a cutout portion at the radially inner surface of its lower end which forms a short horizontal shoulder 64 and a relatively long vertical wall portion 66 adjacent thereto. Accordingly, each of the six record supporting fingers 24 is disposed in a corresponding one of the equally spaced slots 58 in the finger carrier 48 and is supported on the upper end of the plunger 60 with the shoulder portion 64 resting on the top of the plunger. In addition, a metal O-ring 68 encompasses the lower ends of each of the fingers 24 and extends through a small arcuate recess 70 formed in the radially outer side of each such finger. The metal O-ring 68 is mounted in an annular groove formed about the circumference of the upper end of the finger carrier 48, and in this manner the O-ring connects the fingers 24 with the carrier 48 so that the fingers will move with the carrier when the latter slides vertically inside the spindle body 22. It will be understood that the upwardly biased plunger 60 serves to yieldingly maintain the fingers 24 in their normal radially extended positions as illustrated in FIGURE 3, and when the fingers 24 are lowered to the turntable 36 and thereby cammed to radially retracted positions as shown in FIGURE 4, the plunger 60 is forced downwardly somewhat so as to compress the spring 62 as the fingers 24 pivot about the O-ring member 68.

In order to control the vertical movement of the record supporting fingers 24, there is provided the first rotary cam member 30 which is tubular in shape and surrounds the lower end of the spindle body 22 so as to be rotatable thereon. The rotary cam 30 has a helical cam slot 72 formed in the wall thereof, and a cam follower pin 74 is fixedly carried by the lower end of the finger carrier 48 and projects from the side thereof so as to extend into the cam slot 72. It will also be noted that follower pin 74 projects through a vertical slot 76 formed in the spindle body 22 so that the finger carrier 48 can move vertically within the stationary spindle body but cannot rotate therein. Accordingly, rotation of the rotary cam member 30 will produce vertical movement of the finger carrier 48 and the record supporting fingers 24 due to the cooperation between the helical cam slot 72 and the follower pin 74. Since the record changer spindle 20 is of the type which lowers a record substantially the entire distance to the turntable, the fingers 24 must be moved during a record change cycle from their upper positions of FIGURE 3 to their lower retracted positions of FIGURE 4, and the rather substantial vertical length of the helical cam slot 72 is necessary in order to impart the desired vertical stroke to the finger carrier 48. A pinion gear 78 is fixed on the lower end of the rotary cam 30 in order to provide for rotary movement of the latter, and any suitable rack or gear segment or the like (not shown) may be utilized to impart rotary motion to the pinion gear.

Still referring to FIGURES 3 and 4, a cap 80 is pressed into the extreme upper end of the spindle body 22, and the unitary gripper finger unit 28 has its upper end anchored to a boss 84 on the bottom of the cap 80. The gripper finger unit 28 comprises three downwardly depending gripper fingers 86 which are made of spring steel and are formed so as to be biased radially inwardly to the retracted positions shown in FIGURE 3. The lower end of each of the gripper fingers 86 is bent outwardly to provide a laterally extending record engaging portion 88, and a resilient rubber pad 90 is secured to each gripper finger 86 immediately above the gripping portion 88 thereof. FIGURE 9 shows the manner in which three of the slots 26 are widened at their upper ends to provide openings 91 in the spindle body for the gripping portions 88 and pads 90. The vertical location of the gripping fingers 86 is determined so that when the primary supporting fingers 24 are in their normal upper positions of FIGURE 3, the record engaging portions 88 are vertically spaced above the tops of the supporting fingers 24 by an amount which slightly exceeds the thickness of a record R. Accordingly, when the gripping fingers 86 are moved to their radially expanded positions of FIGURE 4, they will engage against the centerhole edge portion of the next-to-lowermost record in the stack and thereby support all but the bottom record, whereby the latter may be lowered to the turntable 36 by the supporting fingers 24. The record engaging finger portions 88 will firmly engage the centerhole edge of the next-to-lowermost record, and the resilient pads 90 will also engage the centerhole edge portions of several of the records in order to assist in supporting the record stack during the change cycle.

In order to actuate the record gripping fingers 86 there is provided a vertically movable center rod 92 having at its upper end an actuator 94 which has a frusto-conical surface 96 formed thereon. The actuator surface 96 engages against the lower ends of the gripping fingers 86 to control the radial position of the latter. Thus, when the actuator 94 is in its upper position as shown in FIGURE 3, the inwardly biased spring fingers 86 are permitted to assume their radially retracted positions, and when the actuator is moved downwardly to its lower position of FIGURE 4, the spring fingers are cammed outwardly to their radially extended positions. The center rod 92 extends downwardly through the bore 54 in the finger carrier 48, and in so doing it passes through the plunger 60 and spring 62. The length of the rod 92 is such that it projects well beneath the turntable 36 and terminates approximately at the interior of the second rotary cam 32.

The lower end of the rod 92 extends into the interior of a follower member 98 (see FIGURES 3 and 10). The follower member 98 has three circumferentially spaced segment 100 of a helical thread formed on the exterior thereof, and the second rotary cam 32 is mounted over the follower 98 and has formed at its interior a cam track in the form of an internal helical acme thread 102 (see FIGURE 11) which receives the thread segments 100 of the follower member 98. It will thus be seen that the helical thread 102 in the rotary cam member 32 co-operates with the three helical thread segments 100 on the follower member 98 in such a manner that rotary movement of the cam member 32 will impart vertical movement to the follower member 98. The lower end of the spindle body 22 is provided with three equally spaced relatively wide vertical slots 104 (see FIGURE 9), and the three thread segments 100 project radially outwardly through corresponding ones of the slots 104. Accordingly, while the slots 104 permit the follower 98 to move vertically relative to the stationary spindle body 22, the follower is prevented from rotating relative to the spindle body. The follower 98 is thus held against rotation but is movable upwardly and downwardly within the lower end of the spindle body 22 in accordance with the direction of rotation of the rotary cam 32. The rotary cam 32 has a plurality of etxernal gear teeth 106 whereby any suitable rack or gear segment or the like (not shown), may be utilized to impart rotary motion thereto.

As previously stated, the lower end of the rod 92 extends into the interior of the follower member 98. A tubular member 108 having a radial flange 109 at the lower end thereof is positioned inside the follower member 98 on the lower end of the rod 92 and held thereon by a knob 110 at the extreme lower end of the rod. The follower member 98 has a radially inwardly extending annular flange 111 at its upper end, and a compression spring 112 is disposed in the annular space between the tubular member 108 and the inner wall of the follower member 98 with the upper end of the spring bearing against the flange 111 and the lower end thereof bearing against the flange 109. The upper end of the tubular member 108 is secured by a lock washer 113 which overlies the upper end of the follower member 98.

In the foregoing manner the rod 92 is yieldingly connected with the follower member 98 so that when the follower member is moved downwardly it applies a downward force to the compression spring 112 which in turn yieldingly moves the rod 92 and actuator 94 downwardly. It will be understood that when the rotary cam 32 is in the position of FIGURE 3, the follower 98 is in its upper position and no downward force is applied to the spring 110 so that the rod 92 and actuator 94 will be disposed in their upper positions of FIGURE 3 and the gripping fingers 86 will be radially retracted. However, when the rotary cam 32 is rotated a predetermined amount to the position of FIGURE 4, the follower 98 is moved downwardly and the rod 92 and actuator 94 are yieldingly moved downwardly to the position of FIGURE 4 to effect radial expansion of the gripping fingers 86.

Figure 2:
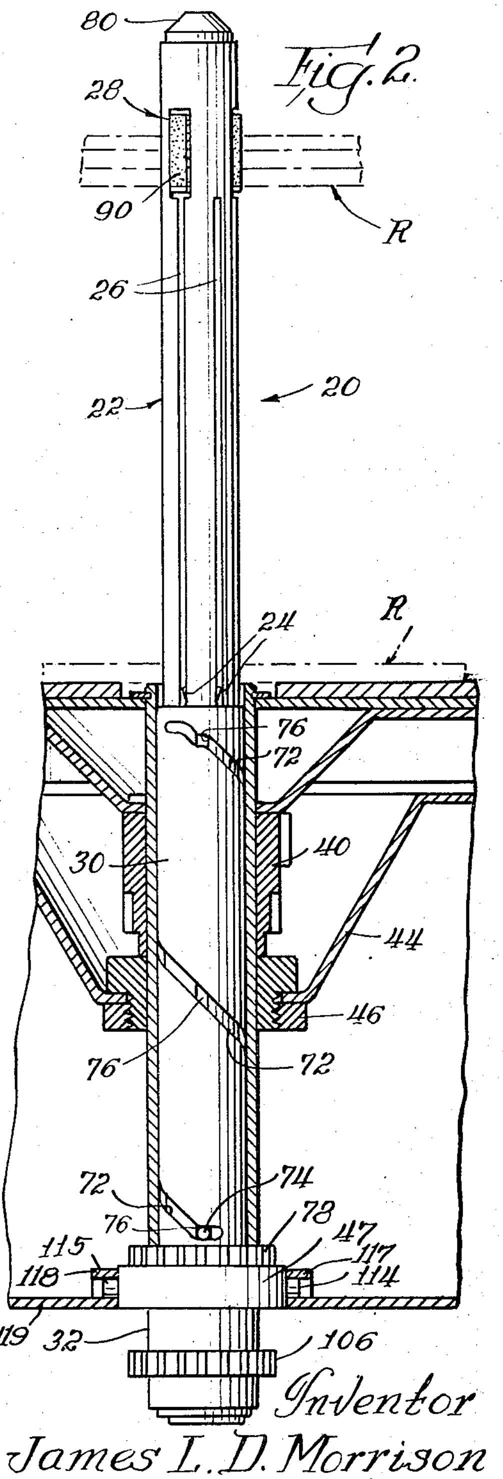
FIGURE 2 is an elevational view similar to FIGURE 1 showing the record supporting fingers in their lowermost radially retracted positions.

As mentioned earlier herein in conjunction with FIGURE 1, the member 47 is mounted over the lower end of the tubular cover member 34 and serves as a support for the spindle body 22. The member 47 as also discussed above may be anchored to the adjacent framework in any suitable manner. With respect to the connection between the member 47 and the spindle body 22, reference is made to FIGURE 3 which shows a pair of pins 114 and 115 which project into openings on opposite sides of the member 47 and extend into opposed holes formed in the lower end of the spindle, one such hole 116 being shown in FIGURE 9. In this manner the spindle supporting member 47 is firmly connected with the lower end of the spindle body 22. As shown in FIGURES 1 and 2, a pair of cap members 117 and 118 extend over the pins 114 and 115, and such cap members form a part of a bracket 119 which is disposed immediately beneath the pins 114 and 115. The bracket 119 is attached to the framework 44, or if desired may be integral therewith. In this manner, the caps 117 and 118 are anchored to the framework and, due to their cooperation with the pins 114 and 115, they serve to support the spindle body 22 and hold it to the frame.

In operation, with the various components positioned as shown in FIGURES 1 and 3, a plurality of records R are placed over the upper end of the spindle 20 so as to be supported on the upper ends of the supporting fingers 24. When the lowermost record is to be released to the turntable 36 for playing, the rotary cam 32 is first rotated a predetermined amount so as to move the follower 98 downwardly and thereby yieldingly pull the center rod 92 and actuator 94 downwardly to the position of FIGURE 4. In this manner the record gripping fingers 86 are radially extended so that they grip the next-to-lowermost record at its centerhole edge and support all but the bottom record of the stack. The rotary cam 30 is then rotated a predetermined amount so as to lower the finger carrier 48 and supporting fingers 24 from the positions of FIGURE 3 to the positions of FIGURE 4. As the supporting fingers 24 move downwardly they lower the bottom record from the upper storage position to the turntable 36, and as the fingers reach the record supporting surface 38 of the turntable they are cammed inwardly to the radially retracted positions of FIGURE 4 to release the lowered record to turntable. The cam 30 is then rotated in the opposite direction so as to return the supporting fingers 24 to their normal positions of FIGURE 3, and finally the rotary cam 32 is returned to its original rotary position to raise the follower 98 thereby permitting radial retraction of the gripping fingers 86 to inoperative positions. When the record on the turntable has been played and it is desired to lower another record to the turntable, the foregoing record change cycle is repeated.

It should be understood that an important feature of the present invention resides in the design of the spindle 20 so as to locate the relatively long rotary cam 30 immediately beneath the turntable as shown in FIGURE 1. The cam 30 should not project above the turntable record supporting surface 38 since it would interfere with the movement of the supporting fingers 24 in the slots 26. However, as shown in FIGURE 1, the upper end of the cam 30 is closely adjacent the turntable record supporting surface 38, with the result that the overall height of the spindle mechanism 20 is reduced to a minimum. The vertical length of the cam 30 is required to be substantial in order to provide for the substantial vertical stroke desired for the supporting fingers 24. Accordingly, the foregoing feature of the present invention is of considerable importance in a spindle of the type designed to lower records under control all the way down to the turntable, and it will be understood that if the cam 30 were located beneath the turntable bearing sleeve 40 rather than telescoped inside the same it would substantially increase the overall vertical dimensions of the spindle assembly. It will thus be seen that the advantages of the foregoing feature of the present invention are accomplished by having the rotary cam 30 extend up inside the turntable bearing sleeve 40 so that the upper end of the cam is closely adjacent the turntable record supporting surface. In the preferred embodiment described herein the stationary thin-walled tubular cover member 34 is mounted over the cam 30 in order to provide a smooth continuous bearing surface for the turntable bearing sleeve 40 to rotate about. It is important to understand that while in the preferred embodiment described herein the turntable bearing has been shown in the form of the sleeve 40, yet if desired the turntable bearing may comprise other known types of bearings such as a ball bearing, a roller bearing, or a ring type bearing, and it is contemplated that use of the latter types of bearings is within the scope of the present invention.

While I have described my invention in a preferred form, I do not intend to be limited to that form except insofar as the appended claims are so limited, since modifications within the scope of my invention will readily occur to others, particularly with my disclosure before them.

I claim:

1. In a record changer of the type having a spindle with record feeding components including record supporting means which is normally extended outwardly of the spindle to support a stack of records on an upper storage portion of the spindle and which is movable downwardly and retractable within the spindle to release the lowermost record to a turntable and further including record gripping means which is normally retracted in the spindle and which is expandable for supporting all but the lowermost record on said upper storage portion, the improvement comprising, in combination, carrier means associated with said record supporting means and movable upwardly and downwardly in said spindle to move said record supporting means between an upper record supporting position and a lower retracted position, cam follower means carried by said carrier means, a rotary cam having a cam track in engagement with said follower means for raising and lowering the latter whereby rotation of said rotary cam will impart vertical movement to said record supporting means, said cam being mounted concentrically relative to the longitudinal axis of said spindle, and a rotatable turntable which includes a record supporting surface and has a bearing member which encircles said spindle, said cam and bearing member being concentrically arranged and such that the axial extent of one along the spindle includes the other, and the upper end of said rotary cam being adjacent to said turntable record supporting surface.

2. The invention of claim 1 wherein said rotary cam is a generally tubular member with a cam track formed in the wall thereof.

3. The invention of claim 2 wherein the cam track has an effective vertical length sufficient to lower said record supporting means from its normal upper record supporting position down approximately to said record supporting surface of said turntable.

4. The combination of claim 1 wherein the carrier means comprises a generally cylindrical member having a plurality of equally spaced vertical slots in the upper end thereof and having a central vertical opening in the upper end thereof inwardly of said slots and in communication therewith, a plunger disposed in said central opening for vertical movement therein, and the record supporting means comprise a plurality of record supporting fingers disposed in corresponding ones of said vertical slots and supported therein by the upper end of said plunger and by ring means which encircle said fingers and is fixed relative to said carrier member, the spindle body including vertically extending slots aligned with said fingers, and spring means biasing said plunger upwardly in said opening to yieldingly urge said fingers outwardly through said vertically extending slots of the spindle body to their normal outwardly extended positions, said plunger being forced downwardly in said opening upon retraction of said fingers.

5. The combination of claim 4 wherein each of said fingers has a cut-out portion at the inner surface of its lower end to provide a shelf which overlies the upper end of said plunger member.

6. The combination of claim 4, wherein the upper end of the spindle has spaced opening and the record gripping means supported inside the upper end of said spindle comprise a plurality of spring fingers which extend downwardly in the spindle in alignment with corresponding ones of said openings in said upper end of the spindle, said spring fingers being made of a relatively hard material and each having a lower end which is bent radially outwardly and the outer edge surface of which provides a record engaging portion, a compressible pad mounted on each of said spring fingers substantially immediately above the respective record engaging portion thereof, each of said pads having a radially outer record engaging surface substantially coextensive with the outer edge surface of the spring finger on which it is mounted, and means disposed inside of said spindle inwardly of said spring fingers for controlling the radial position thereof.

7. In a record changer of the type having a spindle body with record feeding components including record supporting means which is normally extended outwardly of the spindle to support a stack of records on an upper storage portion of the spindle and which is movable downwardly and retractable within the spindle to release the lowermost record to a turntable and further including record gripping means which is normally retracted in the spindle and which is expandable for supporting all but the lowermost record on said upper storage portion, the improvement comprising, in combination, carrier means associated with said record supporting means and movable upwardly and downwardly in said spindle to move said record supporting means between an upper record supporting position and a lower retracted position, cam follower means carried by said carrier means, a generally tubular rotary cam encompassing the lower end of said spindle body and having a cam track formed in the wall thereof in engagement with said follower means for raising and lowering the latter whereby rotation of said rotary cam will impart vertical movement to said record supporting means, said cam being mounted concentrically relative to the longitudinal axis of said spindle, a rotatable turntable which includes a record supporting surface and has a bearing member which encircles said spindle and rotary cam, said cam track having an effective vertical length sufficient to lower said record supporting means from its normal upper record supporting position down approximately to said turntable record supporting surface and said cam being vertically located with its upper end closely adjacent said record supporting surface, and a generally tubular stationary cover member telescoped over said rotary cam so as to provide a bearing surface for said turntable bearing member.

8. In a record changer of the type having a spindle body with record feeding components including record supporting means which is normally extended outwardly of the spindle to support a stack of records on an upper storage portion of the spindle and which is movable downwardly and retractable within the spindle to release the lowermost record to a turntable and further including record gripping means which is normally retracted in the spindle and which is expandable for supporting all but the lowermost record on said upper storage portion, the improvement comprising, in combination, carrier means associated with said record supporting means and movable upwardly and downwardly in said spindle to move said record supporting means between an upper record supporting position and a lower retracted position, cam follower means carried by said carrier means, a first rotary cam having a cam track in engagement with said follower means for raising and lowering the latter whereby rotation of said rotary cam will impart vertical movement to said record supporting means, said first cam being mounted concentrically relative to the longitudinal axis of said spindle, actuator means associated with said record gripping means and vertically movable inside said spindle for actuating said gripping means between retracted and extended positions, a second rotary cam associated with said actuator and mounted concentrically relative to the longitudinal axis of said spindle for imparting vertical movement to said actuator, and a rotatable turntable which includes a record supporting surface and has a bearing member which encircles said spindle, one of said cam members being encircled by the bearing and vertically located with its upper end closely adjacent said turntable record supporting surface, and the other of said cam members being disposed substantially immediately beneath said one cam member.

9. The invention of claim 8 wherein said first rotary cam is disposed with its upper end closely adjacent said turntable record supporting surface and said second rotary cam is disposed substantially immediately beneath said first rotary cam.

10. The invention of claim 9 wherein said spindle body has a vertical slot, said second rotary cam has an internal helical cam track formed therein and a follower member is positioned inside of said second cam and is provided with at least one thread segment which projects radially outwardly through said vertical slot in the spindle body into engagement with said helical cam track, said thread segment projecting through the vertical slot holding the follower against rotation with the second cam while permitting the follower to move vertically upon rotation of said second cam, and said follower member being connected with said actuator means for controlling the retraction and expansion of said record gripping means.

11. In a record changer spindle of the type having record feeding components including record supporting means which is normally extended outwardly of a spindle body to support a stack of records on an upper storage portion of the spindle and which is movable downwardly and retractable within the spindle body to release the lowermost record to a turntable and further including record gripping means which is normally retracted in the spindle and which is expandable for supporting all but the lowermost record on said upper storage portion, the improvement wherein the upper end of the spindle has spaced openings and the record gripping means supported inside the upper end of said spindle comprise a plurality of spring fingers which extend downwardly in the spindle in alignment with corresponding one of said openings in said spindle, said spring fingers being made of a relatively hard material and each having a lower end which is bent radially outwardly and the outer edge surface of which provides a record engaging portion, a compressible pad mounted on each of said spring fingers substantially immediately above the respective record engaging portion thereof, each of said pads having a radially outer record engaging surface substantially coextensive with the outer edge surface of the spring finger on which it is mounted, and means disposed inside of said spindle inwardly of said spring fingers for controlling the radial position thereof.

12. In a record changer of the type having a spindle with record feeding components including record supporting means which is normally extended outwardly of the spindle to support a stack of records on an upper storage portion of the spindle and which is moved downwardly and retractable within the spindle to release the lowermost record to a turntable and further including record gripping means which is normally retracted in the spindle and which is expandable for supporting all but the lowermost record on said upper storage portion, the improvement comprising, in combination, carrier means associated with said record supporting means movable upwardly and downwardly in said spindle to move said record supporting means between an upper record supporting position and a lower retractable position, cam follower means carried by said carrier means, a rotary cam having a cam track in engagement with said follower means for raising and lowering the latter whereby rotation of said rotary cam will impart vertical movement to said record supporting means, said cam being mounted concentrically relative to the longitudinal axis of said spindle, and a rotatable turntable which includes a record supporting surface and has a bearing member which encircles said cam and said spindle, a generally tubular cover member telescoped over said rotary cam so as to be positioned inside of said turntable bearing member, said cover being stationary and serving to provide a bearing surface for said turntable bearing member, and the upper end of said rotary cam being adjacent to said turntable record supporting surface.

References Cited

UNITED STATES PATENTS

| | | | |
|---|---|---|---|
| 2,981,953 | 4/1961 | Hansen | 274—10 |
| 3,021,144 | 2/1962 | Harnisch et al. | 274—10 |
| 3,081,093 | 3/1963 | Tiedtke | 274—10 |
| 3,201,130 | 8/1965 | Morrison et al. | 274—10 |
| 3,279,797 | 10/1966 | Goulding | 274—10 |
| 3,241,838 | 3/1966 | Morrison | 274—10 |
| 3,241,839 | 3/1966 | Morrison | 274—10 |

FOREIGN PATENTS

| | | |
|---|---|---|
| 1,034,383 | 7/1958 | Germany. |

HARRY N. HAROIAN, *Primary Examiner.*